United States Patent
Lin (10) Patent No.: US 12,164,443 B2
(45) Date of Patent: Dec. 10, 2024

(54) EVENT TRIGGER MASTER, CONTROL CHIP AND CONTROL METHOD THEREOF

(71) Applicant: Nuvoton Technology Corporation, Hsinchu (TW)

(72) Inventor: Zong-Min Lin, Kaohsiung (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 232 days.

(21) Appl. No.: 17/847,066

(22) Filed: Jun. 22, 2022

(65) Prior Publication Data

US 2023/0418769 A1    Dec. 28, 2023

(51) Int. Cl.
*G06F 13/10*    (2006.01)
*G06F 13/362*    (2006.01)

(52) U.S. Cl.
CPC .......... *G06F 13/102* (2013.01); *G06F 13/362* (2013.01)

(58) Field of Classification Search
None
See application file for complete search history.

(56) References Cited

U.S. PATENT DOCUMENTS

2013/0054852 A1* 2/2013 Fuoco ................. G06F 13/4022
710/110

FOREIGN PATENT DOCUMENTS

TW    I545440 B    8/2016

* cited by examiner

*Primary Examiner* — Scott C Sun
(74) *Attorney, Agent, or Firm* — MUNCY, GEISSLER, OLDS & LOWE, P.C.

(57) ABSTRACT

An event trigger master coupled to a first peripheral device and including an event receiving interface, a storage element, a state machine, and a master interface is provided. The event receiving interface is configured to receive an event request. The storage element includes a command queue to store a set command. The state machine performs the set command to access the first peripheral device or a second peripheral device in response to the event request being triggered. The master interface is coupled to the state machine, the first peripheral device, and the second peripheral device. The state machine accesses the first or second peripheral device via the master interface.

18 Claims, 4 Drawing Sheets

EVENT TRIGGER MASTER, CONTROL CHIP AND CONTROL METHOD THEREOF

BACKGROUND OF THE INVENTION

Field of the Invention

The invention relates to an event trigger master, and more particularly to an event trigger master that is coupled between a processor and a peripheral device.

Description of the Related Art

As technology has developed, there are more types of electronic devices available on the consumer market, and the functionality of these electronic devices has increased. Each electronic device comprises many control chips. In general, a control chip comprises a processor. The processor is an important element in the control chip, because the processor controls all elements of said control chip.

For example, a processor may trigger a first specific circuit to direct it to perform a predetermined operation. The first specific circuit performs the predetermined operation, and simultaneously, the processor may read and execute program code. After finishing the predetermined operation, the first specific circuit sends an event notice. Therefore, the processor stops running the program code and triggers a second specific circuit according to the event notice sent from the first specific circuit. The second specific circuit performs a predetermined operation, and simultaneously, the process may continue to read and run the program code. After finishing the predetermined operation, the second specific circuit sends an event notice. Therefore, the processor again stops running the program code and operates according to the event notice sent from the second specific circuit. Since the operation of the processor is interrupted many times, the efficiency of the processor is reduced.

BRIEF SUMMARY OF THE INVENTION

In accordance with an embodiment of the disclosure, an event trigger master is coupled to a first peripheral device and comprises an event receiving interface, a storage element, a state machine, and a master interface. The event receiving interface is configured to receive an event request. The storage element comprises a command queue to store a set command. The state machine performs the set command to access the first peripheral device or a second peripheral device in response to the event request being triggered. The master interface is coupled to the state machine, the first peripheral device, and the second peripheral device. The state machine accesses the first or second peripheral device via the master interface.

In accordance with another embodiment of the disclosure, a control chip comprises a first peripheral device, a second peripheral device, a peripheral system bus, and an event trigger master. The peripheral system bus is coupled to the first and second peripheral devices. The event trigger master communicates with the first and second peripheral devices via the peripheral system bus and comprises an event receiving interface, a storage element, a state machine, and a master interface. The event receiving interface is configured to receive an event request. The storage element comprises a command queue to store a set command. The state machine performs the set command to access the first or second peripheral device in response to the event request being triggered. The master interface is coupled between the state machine and the peripheral system bus. The state machine accesses the first or second peripheral device via the master interface and the peripheral system bus.

In accordance with a further embodiment of the disclosure, a control method controls a first peripheral device and a second peripheral device and comprises storing a set command provided by a processor; determining whether an event request is triggered; performing the set command to access the first or second peripheral device in response to the event request being triggered. The set command is performed by an event trigger master. The event trigger master responds to the event request which is triggered, and the processor does not respond to the event request which is triggered.

Control methods may be practiced by the systems which have hardware or firmware capable of performing particular functions and may take the form of program code embodied in a tangible media. When the program code is loaded into and executed by an electronic device, a processor, a computer or a machine, the electronic device, the processor, the computer or the machine becomes an event trigger master or a control chip for practicing the disclosed method.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

Figure 1:
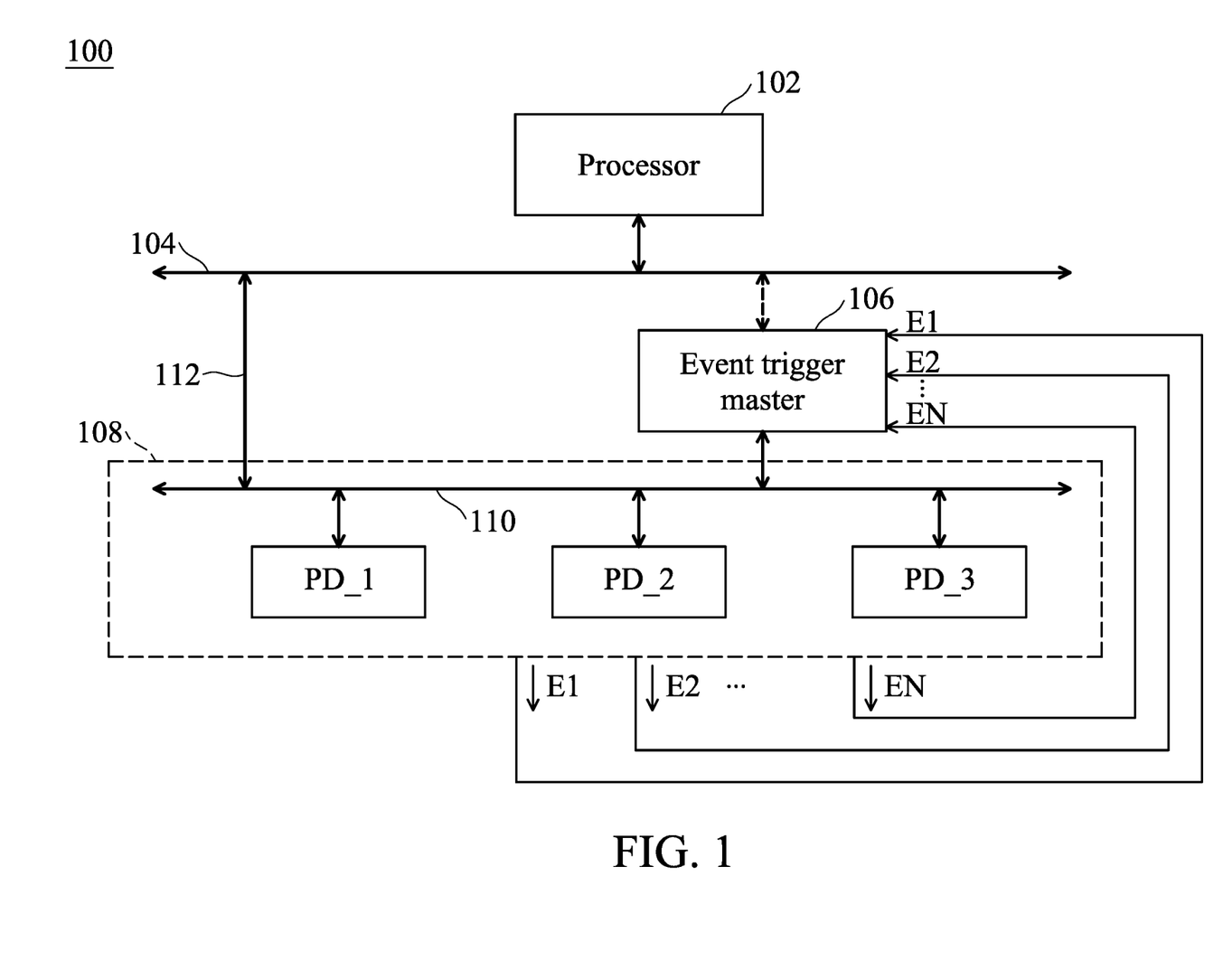
FIG. 1 is a schematic diagram of an exemplary embodiment of a control chip according to various aspects of the present disclosure.

FIG. 1 is a schematic diagram of an exemplary embodiment of a control chip according to various aspects of the present disclosure. The control chip 100 comprises a processor 102, a main system bus 104, an event trigger master 106, and a peripheral circuit 108. The processor 102 is coupled to the main system bus 104. In one embodiment, the processor 102 is a central processing unit (CPU).

The event trigger master 106 is coupled to the peripheral circuit 108 and receives event requests E1~EN. When an event request is triggered, the event trigger master 106 sets the peripheral circuit 108 to direct the peripheral circuit 108 to perform a specific operation. After completing the specific operation, the peripheral circuit 108 may trigger one of the event requests E1~EN. At this time, the event trigger master 106 performs a specific operation according to the triggered event request. For example, the event trigger master 106 may interrupt the processor 102 or re-set the peripheral circuit 108 to control the peripheral circuit 108 to perform another specific operation. In this embodiment, the event trigger master 106 is served as a master device to control the peripheral circuit 108. In this case, the peripheral circuit 108 is served as a slave.

In some embodiments, the event trigger master 106 is directly connected to the main system bus 104. In such cases, the event trigger master 106 sends an interruption signal to the processor 102 via the main system bus 104. Additionally, the processor 102 may send data to the event trigger master 106 or receive data from the event trigger master 106. At this time, the processor 102 is served as a master device, and the event trigger master 106 is served as a slave device. In this embodiment, the main system bus 104 is configured to connect the processor 102 to the event trigger master 106 such that the processor 102 is capable of accessing the event trigger master 106.

In other embodiments, the control chip 100 further comprises a transmission interface 112. The transmission interface 112 is coupled between the main system bus 104 and peripheral circuit 108. In this case, the processor 102 sends data to the peripheral circuit 108 or receive data from the peripheral circuit 108 via the transmission interface 112. Furthermore, the processor 102 also sends data to the event trigger master 106 or receive data from the event trigger master 106 via the transmission interface 112 and the peripheral circuit 108.

In one embodiment, the peripheral circuit 108 generates the event requests E1~EN and comprises a peripheral system bus 110 and the peripheral devices PD_1~PD_3. The peripheral system bus 110 is coupled between the event trigger master 106 and the peripheral devices PD_1~PD_3. In this case, the peripheral system bus 110 provides a connection such that the event trigger master 106 is capable of accessing the peripheral devices PD_1~PD_3. For example, the event trigger master 106 may perform a set operation for the peripheral devices PD_1~PD_3.

For example, the event trigger master 106 outputs control commands to the peripheral devices PD_1~PD_3 via the peripheral system bus 110 or receive the replies from the peripheral devices PD_1~PD_3 via the peripheral system bus 110. In other embodiments, the processor 102 communicates with the event trigger master 106 via the peripheral system bus 110, the transmission interface 112, and the main system bus 104.

The peripheral devices PD_1~PD_3 are coupled to the peripheral system bus 110 to receive data from the peripheral system bus 110 or output data to the peripheral system bus 110. For brevity, FIG. 1 only shows the peripheral devices PD_1~PD_3, but the disclosure is not limited thereto. In other embodiments, the peripheral circuit 108 further the more of the fewer peripheral devices.

In this embodiment, the event requests E1~EN are generated by the peripheral devices PD_1~PD_3. The present disclosure does not limit the number of event requests generated by each peripheral device. In one embodiment, each peripheral device generates a single event request. In this case, the number of event requests E1~EN is the same as the number of peripheral devices of the peripheral circuit 108.

In other embodiments, at least one of the peripheral devices PD_1~PD_3 generates a plurality of event requests. In such cases, when a peripheral device completes different specific operations, the peripheral device triggers different event requests. Taking the peripheral device PD_1 as an example, when the peripheral device PD_1 completes a first operation (e.g., a timer operation), the peripheral device PD_1 triggers the event request E1. When the peripheral device PD_1 completes a second operation (e.g., a counting operation), the peripheral device PD_1 triggers the event request E2. In some embodiments, each of the first and second operations is a timer operation, but the duration of performing the first operation is different from the duration of performing the second operation. In this case, the first operation is seen as distinct from the second operation. In other embodiments, the number of event requests generated by at least one of the peripheral devices PD_1~PD_3 is different from the number of event requests generated by another peripheral device.

The kind of peripheral devices PD_1~PD_3 is not limited. The kind of at least one of the peripheral devices PD_1~PD_3 may be the same as the kind of another of the peripheral devices PD_1~PD_3. In one embodiment, one of the peripheral devices PD_1~PD_3 is a serial peripheral interface (SPI), a pulse-width modulation (PWM) circuit, an analog-to-digital converter (ADC), a direct memory access (DMA) controller, a timer, etc.

In this embodiment, the event trigger master 106 determines whether the peripheral devices PD_1~PD_3 complete the corresponding operations according to the event requests E1~EN. After one of the peripheral devices PD_1~PD_3 completes the corresponding operation, the event trigger master 106 triggers one of the peripheral devices PD_1~PD_3 according to the set data stored in the event trigger master 106. Therefore, the processor 102 does not be interrupted by many times. The processor 102 performs a corresponding operation after the event trigger master 106 sends an interruption signal. Therefore, the processor 102 has more time for other operations so that the efficiency of the processor 102 is increasing.

In other embodiments, the processor 102 is located in a first power domain (not shown), and the event trigger master 106 is located in a second power domain (not shown). The first power domain is independent of the second power domain. Therefore, when the power of the first power domain is reduced, even if the processor 102 enters a power-down mode and stops operating, the event trigger master 106 and the peripheral circuit 108 operate normally, as long as the power of the second power domain is enough.

In other embodiments, the processor 102 is located in a first clock domain (not shown), and the event trigger master 106 and the peripheral devices PD_1~PD_3 are located in a second clock domain (not shown). The first clock domain is independent of the second clock domain. Therefore, when the frequency of the clock signal in the first clock domain is reduced, even if the processor 102 enters a power-down mode and stops operating, the event trigger master 106 and the peripheral circuit 108 work normally, as long as the frequency of the clock signal in the second clock domain is maintained. In this case, the processor 102, the event trigger master 106 and the peripheral circuit 108 are located in the same power domain.

Figure 2:
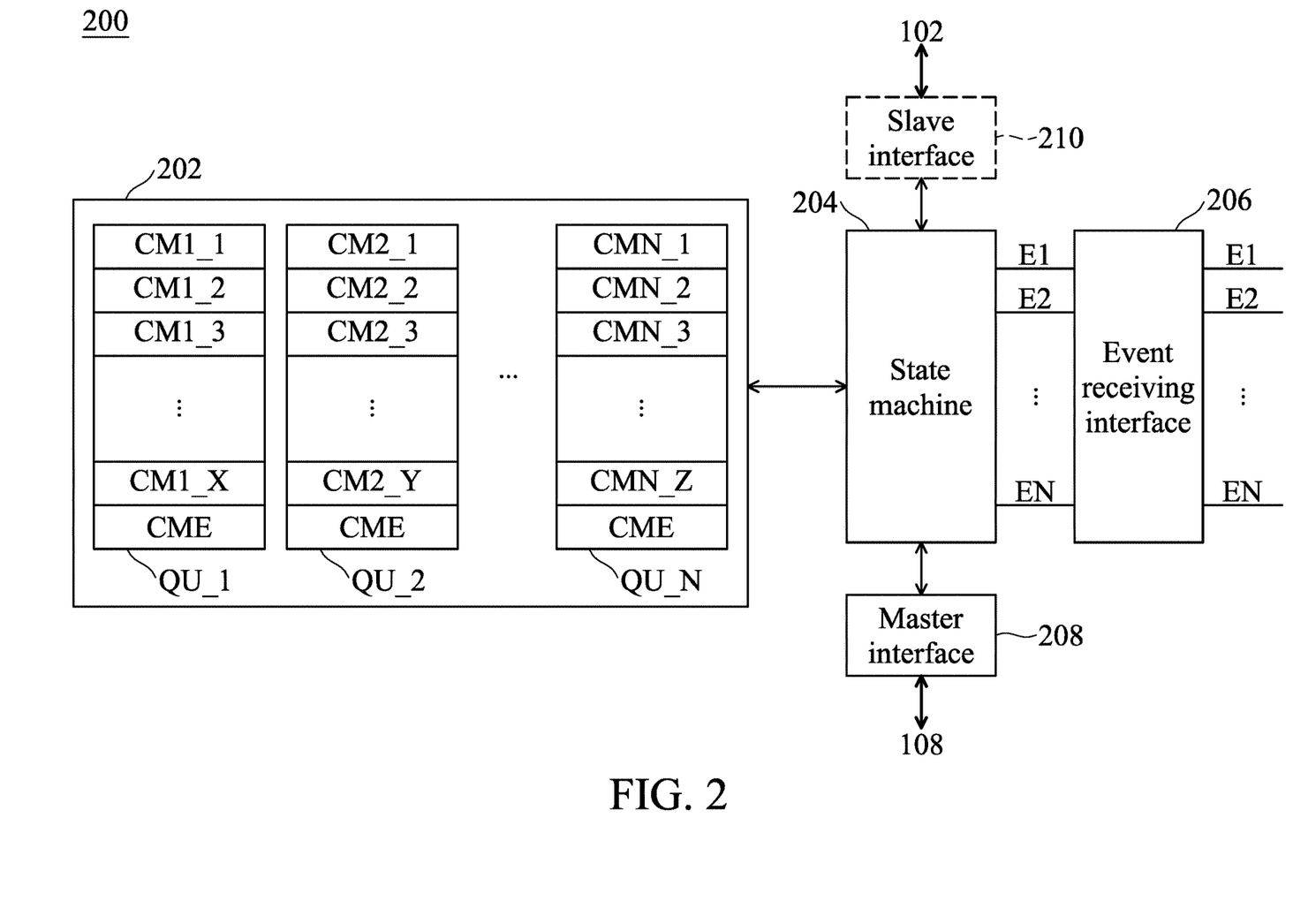
FIG. 2 is a schematic diagram of an exemplary embodiment of an event trigger master according to various aspects of the present disclosure.

FIG. 2 is a schematic diagram of an exemplary embodiment of an event trigger master according to various aspects of the present disclosure. The event trigger master 200 comprises a storage element 202, a state machine 204, an event receiving interface 206, and a master interface 208. The storage element 202 comprises command queues QU_1~QU_N. The number of queues is not limited in the present disclosure. In one embodiment, the number of queues is the same as the number of event requests. Additionally, the command queues QU_1~QU_N may store the different blocks in the same memory. In other embodiments, the storage element 202 may comprise different memories. Each memory stores a corresponding queue.

In this embodiment, each queue stores at least one set command. As shown in FIG. 2, the command queue QU_1 stores the set commands CM1_1~CM1_X, the command queue QU_2 stores the set commands CM2_1~CM2_Y, and the command queue QU_N stores the set commands CMN_1~CMN_Z. The number of set commands stored in the command queues QU_1~QU_N is not limited in the present disclosure. The number of set commands stored in one of the command queues QU_1~QU_N may be the same or different from the number of set commands stored in another of the command queues QU_1~QU_N.

In some embodiments, each of the command queues QU_1~QU_N further comprises an end command CME. Each of the end commands CME is located behind the last set command of each of the command queues QU_1~QU_N. Taking the command queue QU_1 as an example, assume that the set commands CM1_1~CM1_X are arranged successively, the set command CM1_1 is a first set command, and the set command CM1_X is a last set command. In this case, the end command CME is located behind the set command CM1_X. In one embodiment, the end command CME represents the end of the queue, and the value of the end command CME may be 0xFFFF_FFFF or 0x0000_0000.

The format of each set command of the command queues QU_1~QU_N is not limited in the present disclosure. Taking the command queue QU_1 as an example, each of the set commands CM1_1~CM1_X may have address information and data information. In another embodiment, each set command of the command queue QU_1 further has bit mask information. In some embodiments, each set command of the command queue QU_1 may have an identification code.

The state machine 204 is coupled to the storage element 202, the event receiving interface 206, and the master interface 208. The state machine 204 receives the event requests E1~EN via the event receiving interface 206. When one event request is triggered, the state machine 204 reads a corresponding queue (e.g., the command queue QU_1) of the storage element 202 and performs the set commands (CM1_1~CM1_X) stored in the corresponding queue to provide at least one set value to a corresponding peripheral device. In one embodiment, when the state machine 204 performs the end command in the command queue QU_1, it means that all set commands in the command queue QU_1 are performed. Therefore, the state machine 204 triggers a corresponding peripheral device. The corresponding peripheral device operates according to the set values provided by the state machine 204. When the corresponding peripheral device finishes a specific operation, the corresponding peripheral device triggers an event request such that the state machine 204 reads a corresponding queue and performs the set commands in the corresponding queue according to the triggered event request.

The event receiving interface 206 is coupled to the state machine 204 and a peripheral circuit (e.g., 108) to receive the event requests E1~EN from the peripheral circuit and provides the event requests E1~EN to the state machine 204. In one embodiment, the event receiving interface 206 has a plurality of pins (now shown) to receive the event requests E1~EN. In this case, the number of pins of the event receiving interface 206 is the same as the number of event requests E1~EN.

The master interface 208 is coupled to the state machine 204 and a peripheral circuit. Taking FIG. 1 as an example, the master interface 208 is coupled to the peripheral system bus 110 of the peripheral circuit 108. In this case, the state machine 204 outputs the set values to a corresponding peripheral device via the master interface 208 and the peripheral system bus 110. Therefore, the master interface 208 is served as a connection such that the state machine 204 is capable of performing set operations for many peripheral devices. For brevity, assume that the state machine 204 communicates with the peripheral devices PD_1~PD_3 via the peripheral system bus 110.

In one embodiment, the set commands in different queues corresponds to different peripheral devices. For example, when the peripheral device PD_1 completes a first operation, the peripheral device PD_1 triggers the event request E1. At this time, the state machine 204 reads a corresponding queue (e.g., QU_1) according to the triggered event request E1. In this case, the state machine 204 reads and performs the set commands CM1_1~CM1_X to write data to the peripheral device PD_2 until the state machine 204 performs the end command CME. After the state machine 204 completes the end command CME, it means that the state machine 204 finishes all commands corresponding to the event request E1. In this embodiment, the end command CME indicates the end of the queue.

When the peripheral device PD_2 completes a second operation, the peripheral device PD_2 triggers the event request E2. Therefore, the state machine 204 reads a corresponding command queue (e.g., QU_2). In this case, the state machine 204 reads and performs the set commands CM2_1~CM2_Y to write data into the peripheral device PD_3 until the state machine 204 performs the end command CME of the command queue QU_2. The end command CME of the command queue QU_2 may be the same as the end command CME of the command queue QU_1. In one embodiment, when the peripheral device PD_3 completes the corresponding operation, the peripheral device PD_3 triggers the event request E3. Therefore, the state machine 204 reads a corresponding command queue (e.g., QU_N). In such case, after performing the set commands CMN_1~CMN_Z, the state machine 204 sends an interruption signal to a processor (102) via the master interface 208.

In other embodiments, the set commands in different queues may correspond to the same peripheral device. In this case, the same peripheral device performs different operations according to the set commands in different queues. For example, when the event request E1 is triggered, the state machine 204 reads the command queue QU_1 and performs the set commands CM1_1~CM1_X to write data into the peripheral device PD_1. Next, the peripheral device PD_1 performs a first operation. After finishing the first operation, the peripheral device PD_1 may trigger the event request E2. At this time, the state machine 204 may read the command queue QU_2 and performs the set commands CM2_1~CM2_Y to write data into the peripheral device PD_1. Then, the peripheral device PD_1 performs a second operation.

In other embodiments, the different set commands in the same queue may correspond to different peripheral devices. Taking the command queue QU_1 as an example, when the event request E1 is triggered, the state machine 204 reads the command queue QU_1. In such cases, the state machine 204 writes first data information into the peripheral device PD_1 according to the identification code of the set command CM1_1, writes second data information into the peripheral device PD_2 according to the identification code of the set command CM1_2, and writes third data information into the peripheral device PD_3 according to the identification code of the set command CM1_3.

In some embodiment, the state machine 204 utilizes the master interface 208 to receive data (e.g., the set commands CM1_1~CM1_X, CM2_1~CM2_Y, CMN_1~CMN_Z, and the end command CME) from the processor 102. In this case, the state machine 204 writes the set commands CM1_1~CM1_X, CM2_1~CM2_Y, and CMN_1~CMN_Z into the command queues QU_1~QU_N. In other embodiments, the event trigger master 200 further comprises a slave interface 210. The slave interface 210 is coupled between the state machine 204 and the processor 102. In this case, the slave interface 210 is configured to receives the set commands CM1_1~CM1_X, CM2_1~CM2_Y, and CMN_1~CMN_Z, and the end command CME from the main system bus 104. The state machine 204 writes the set commands CM1_1~CM1_X, CM2_1~CM2_Y, and CMN_1~CMN_Z, and the end command CME into the storage element 202. The kind of slave interface 210 is not limited in the present disclosure. In one embodiment, the kind of slave interface 210 is the same as the kind of master interface 208.

Figure 3:
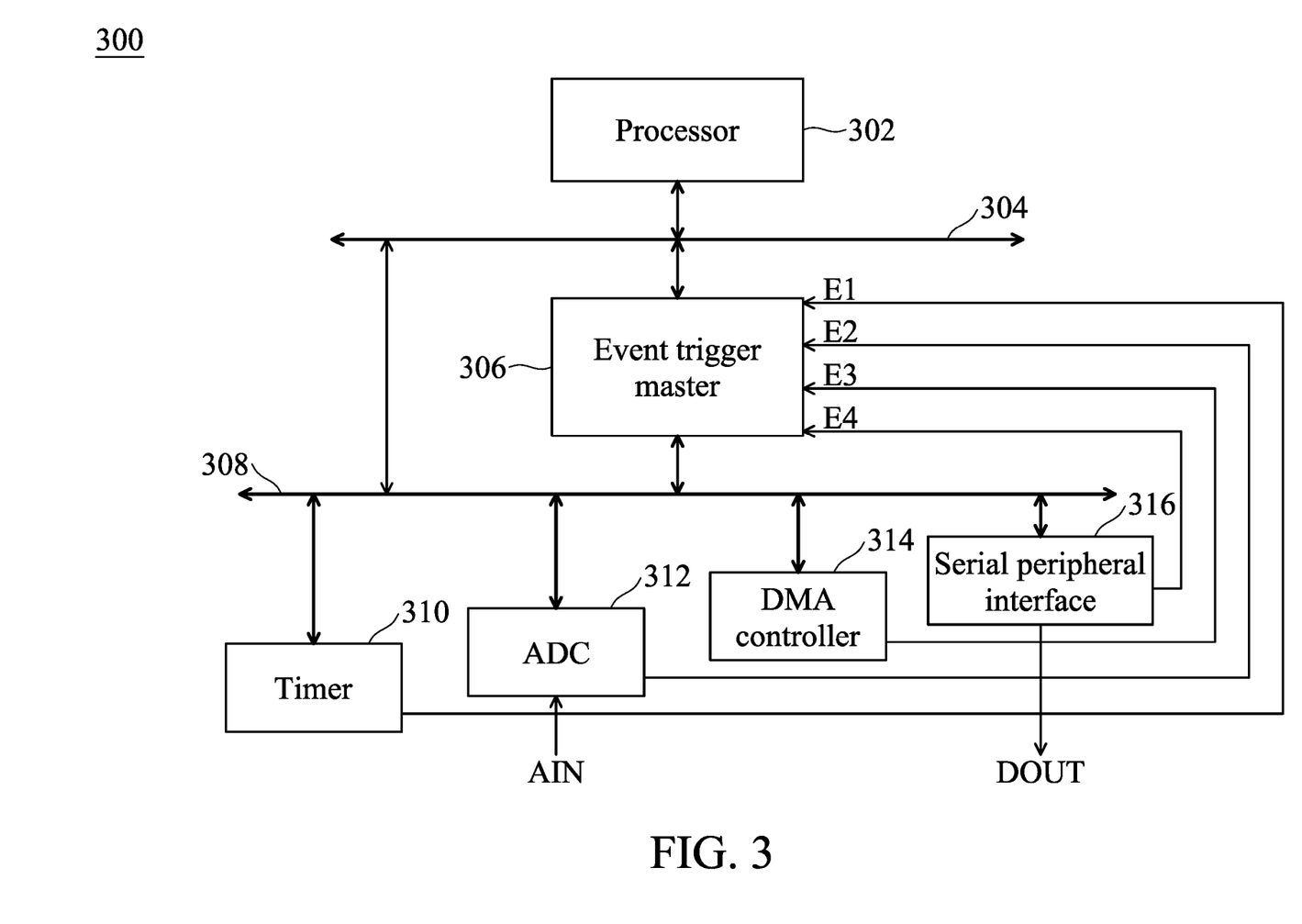
FIG. 3 is a control schematic diagram of an exemplary embodiment of the control chip according to various aspects of the present disclosure.

FIG. 3 is a control schematic diagram of an exemplary embodiment of the control chip according to various aspects of the present disclosure. The control chip 300 comprises a processor 302, a main system bus 304, an event trigger master 306, a peripheral system bus 308, a timer 310, an ADC 312, a DMA controller 314, and a serial peripheral interface 316. The timer 310, the ADC 312, the DMA controller 314, and the serial peripheral interface 316 are peripheral devices.

In one embodiment, the processor 302, the event trigger master 306, and the DMA controller 314 are capable of accessing a static random access memory (SRAM), the ADC 312 and the serial peripheral interface 316. In this embodiment, the event trigger master 306 receives the event request E1 generated by the timer 310, the event request E2 generated by the ADC 312, the event request E3 generated by the DMA controller 314, and the event request E4 generated by the serial peripheral interface 316.

When the duration in which the timer 310 performs a timing operation reaches a predetermined value, the timer 310 triggers the event request E1. Therefore, the event trigger master 306 performs the set commands in a first queue (not shown) to set the ADC 312. In this case, the ADC 312 samples an analog signal AIN. After sampling the analog signal AIN, the ADC 312 triggers the event request E2. At this time, the event trigger master 306 performs the set commands in a second queue to set the DMA controller 314. After setting the DMA controller 314, the DMA controller 314 reads the sampled result generated by the ADC 312 and writes the sampled result into the registers of the serial peripheral interface 316. After finishing the writing operation, the serial peripheral interface 316 triggers the event request E3.

At this time, the event trigger master 306 performs the set commands in a third queue to set the serial peripheral interface 316. In this case, the serial peripheral interface 316 serves the sampled result generated by the ADC 312 as output data and encodes the output data into the output signal DOUT. When the serial peripheral interface 316 finishes the output operation, the serial peripheral interface 316 may trigger the event request E4. In this case, the event trigger master 306 performs the set commands in a fourth queue to send an interruption signal to the processor 302. In other embodiments, when the serial peripheral interface 316 finishes the output operation, the serial peripheral interface 316 directly sends an interruption signal to the processor 302.

After receiving the interruption signal, the processor 302 knows that a series of operations is finished. The series of operations is that the duration in which the timer 310 performs the timing operation reaches a predetermined value, and the ADC 312 samples the analog signal AIN and outputs the sampled result via the serial peripheral interface 316. In this embodiment, since the processor 302 does not need to monitor and determine whether each peripheral device finishes the corresponding specific operation, the processor 302 is capable of performing other operations. Therefore, the efficiency of the processor 302 is increased.

Figure 4:
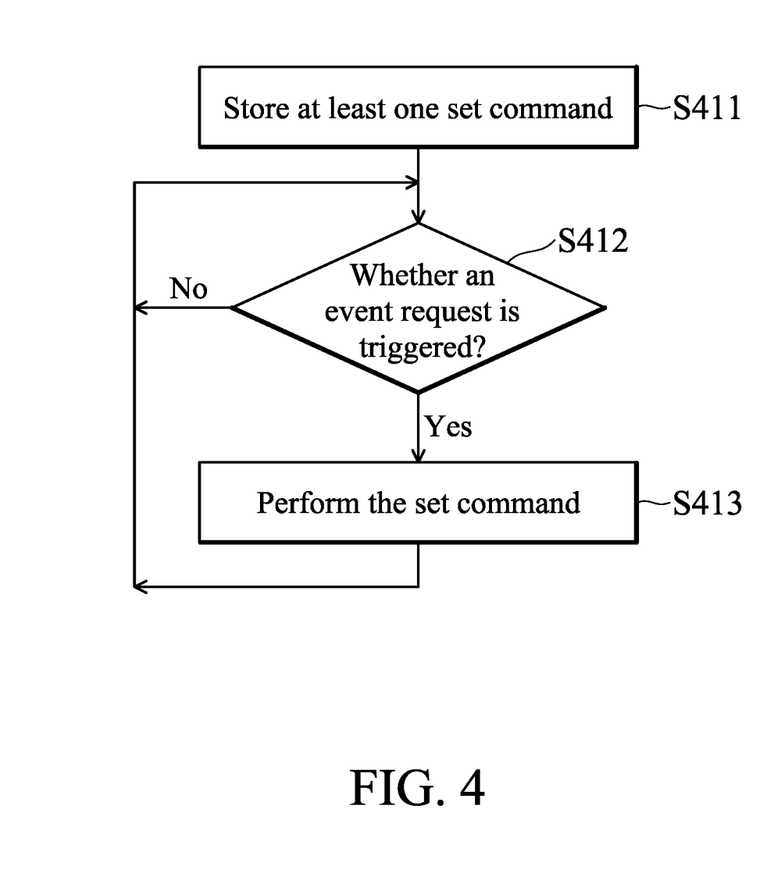
FIG. 4 is a flowchart of an exemplary embodiment of a control method according to various aspects of the present disclosure.

FIG. 4 is a flowchart of an exemplary embodiment of a control method according to various aspects of the present disclosure. The control method is used to control many peripheral devices. For brevity, a first peripheral device and a second peripheral device are used as an example.

First, at least one set command is stored (step S411). In this embodiment, the set command is provided by a processor. In this case, the processor writes the set command into an event trigger master via a main system bus. In other embodiments, the processor may utilize a main system bus and a peripheral system bus to write the set command to an event trigger master. In some embodiments, the processor further provides at least one end command to the event trigger master. The format of the set command is not limited in the present disclosure. In one embodiment, the set command may have address information and set information. In another embodiment, the set command further has bit mask information. In some embodiments, the set command may comprise an identification code.

A determination is made as to whether an event request is triggered (step S412). When the event request is not triggered, step S412 is performed. When the event request is triggered, the set command is performed to set the first or second peripheral device (step S413). In one embodiment, the event trigger master detects whether the event request is triggered. In this case, the event trigger master comprises at least one queue to store the set command. When an event request is triggered, the event trigger master reads the corresponding queue and performs the set command stored in the corresponding queue to set a corresponding peripheral device.

In this embodiment, the event trigger master detects whether an event request is triggered and the event trigger master responds to the triggered event request. Therefore, the processor does not need to respond to the event request such that the processor can perform other operations. Since the processor does not need to respond to each triggered event request, the efficiency of the processor is increased.

Control methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an event trigger master or a control chip for practicing the control methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an event trigger master or a control chip for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An event trigger master coupled to a first peripheral device, comprising:
    an event receiving interface configured to receive a first event request;
    a storage element comprising a first command queue to store a first set command;
    a state machine performing the first set command to access the first peripheral device or a second peripheral device in response to the first event request being triggered; and
    a master interface coupled to the state machine, the first peripheral device, and the second peripheral device,
    wherein the state machine accesses the first or second peripheral device via the master interface.

2. The event trigger master as claimed in claim 1, wherein the state machine receives the first set command from a processor via the master interface and writes the first set command into the storage element.

3. The event trigger master as claimed in claim 1, further comprising:
    a slave interface coupled between the state machine and a processor,
    wherein the state machine receives the first set command from the processor via the slave interface and writes the first set command into the storage element.

4. The event trigger master as claimed in claim 1, wherein the storage element further comprises:
    a second command queue configured to store a second set command.

5. The event trigger master as claimed in claim 4, wherein:
    in response to the first event request being triggered, the state machine performs the first set command to access the first peripheral device,
    in response to a second event request being triggered, the state machine performs the second set command to access the second peripheral device.

6. The event trigger master as claimed in claim 4, wherein:
    in response to the first event request being triggered, the state machine performs the first set command to access the first peripheral device and direct the first peripheral device to perform a first operation,
    in response to a second event request being triggered, the state machine performs the second set command to access the first peripheral device and direct the first peripheral device to perform a second operation.

7. The event trigger master as claimed in claim 6, wherein the first operation is different from the second operation.

8. The event trigger master as claimed in claim 6, wherein:
    the first command queue comprises a plurality of first set commands and a first end command,
    in response to the first event request being triggered, the state machine reads and performs the first set commands of the first command queue until the state machine performs the first end command, and
    after performing the first end command, the state machine stops reading the first command queue.

9. The event trigger master as claimed in claim 8, wherein:
    the first command queue comprises a plurality of second set commands and a second end command,
    in response to the second event request being triggered, the state machine reads and performs the second set commands of the second command queue until the state machine performs the second end command,
    after performing the second end command, the state machine stops reading the second command queue.

10. The event trigger master as claimed in claim 1, wherein:
    the first command queue further stores a second set command,
    in response to the first event request being triggered, the state machine performs the first set command to access the first peripheral device and performs the second set command to access the second peripheral device.

11. A control chip comprising:
    a first peripheral device;
    a second peripheral device;
    a peripheral system bus coupled to the first and second peripheral devices; and
    an event trigger master communicating with the first and second peripheral devices via the peripheral system bus and comprising:
        an event receiving interface configured to receive a first event request;
        a storage element comprising a first command queue to store a first set command;
        a state machine performing the first set command to access the first or second peripheral device in response to the first event request being triggered; and
        a master interface coupled between the state machine and the peripheral system bus,
        wherein the state machine accesses the first or second peripheral device via the master interface and the peripheral system bus.

12. The control chip as claimed in claim 11, wherein the event trigger master further comprises:
    a slave interface coupled between the state machine to provide the first set command to the state machine,
    wherein after receiving the first set command, the state machine writes the first set command into the first command queue.

13. The control chip as claimed in claim 12, further comprising:
- a processor configured to generate the first set command; and
- a main system bus coupled between the processor and the slave interface to provide the first set command generated by the processor to the slave interface.

14. The control chip as claimed in claim 13, wherein the event trigger master responds to the first event request which is triggered, and the processor does not respond to the first event request which is triggered.

15. The control chip as claimed in claim 13, wherein the processor is located in a first power domain, the event trigger master and the first and second peripheral devices are located in a second power domain, and the first power domain is independent of the second power domain.

16. The control chip as claimed in claim 13, wherein the processor is located in a first clock domain, the event trigger master and the first and second peripheral devices are located in a second clock domain, and the first clock domain is independent of the second clock domain.

17. The control chip as claimed in claim 11, wherein:
- the first command queue further stores a second set command,
- in response to the first event request being triggered, the state machine performs the first set command to set the first peripheral device, and
- in response to the second event request being triggered, the state machine performs the second set command to set the second peripheral device.

18. The control chip as claimed in claim 11, wherein the storage element further comprises:
- a second command queue configured to store a second set command, wherein:
- in response to the first event request being triggered, the state machine performs the first set command to set the first peripheral device, and
- in response to a second event request being triggered, the state machine performs the second set command to set the second peripheral device.

\* \* \* \* \*